(12) United States Patent
Harris

(10) Patent No.: US 7,931,369 B2
(45) Date of Patent: Apr. 26, 2011

(54) TINTED LENS AND METHOD OF MAKING SAME

(76) Inventor: David Andrew Harris, Canterbury (GB)

(*) Notice: Subject to any disclaimer, the term of this patent is extended or adjusted under 35 U.S.C. 154(b) by 290 days.

(21) Appl. No.: 11/827,893

(22) Filed: Jul. 13, 2007

(65) Prior Publication Data

US 2009/0015786 A1    Jan. 15, 2009

(51) Int. Cl.
*G02C 7/04* (2006.01)
*G02C 7/02* (2006.01)

(52) U.S. Cl. .................................. 351/163; 351/159

(58) Field of Classification Search .............. 359/159, 359/163–165; 351/159, 163–165
See application file for complete search history.

(56) References Cited

U.S. PATENT DOCUMENTS

| | | |
|---|---|---|
| 3,586,423 A | 6/1971 | Zeltzer |
| 3,701,590 A | 10/1972 | Zeltzer |
| 4,300,819 A | 11/1981 | Taylor |
| 4,998,817 A | 3/1991 | Zeltzer |
| 5,021,196 A * | 6/1991 | Crano et al. ............ 252/586 |
| 5,453,100 A | 9/1995 | Sieloff |
| 5,574,517 A | 11/1996 | Pang et al. |
| 5,617,154 A | 4/1997 | Hoffman |
| 5,846,457 A | 12/1998 | Hoffman |
| 5,917,573 A | 6/1999 | Davis |
| 6,089,712 A | 7/2000 | Harris |
| 6,135,595 A | 10/2000 | Takeshita et al. |
| 6,145,984 A | 11/2000 | Farwig |
| 6,811,258 B1 | 11/2004 | Grant |
| 7,059,719 B2 | 6/2006 | Asher |
| 7,147,326 B2 | 12/2006 | Kunzler et al. |
| 2002/0055007 A1 | 5/2002 | Soane et al. |
| 2003/0076474 A1 * | 4/2003 | Wang et al. ............ 351/44 |

FOREIGN PATENT DOCUMENTS

| | | |
|---|---|---|
| CA | 2 273 943 A1 | 11/1998 |
| DE | 2548395 | 5/1976 |
| EP | 0 943 117 B1 | 3/2003 |
| JP | 2000-047145 | 2/2000 |
| WO | WO 98/25173 | 6/1998 |
| WO | WO2006110306 | 10/2006 |

OTHER PUBLICATIONS

International Search Report of PCT/US2007/073973 dated Mar. 31, 2008.
Web Page http://www.colorview.co.uk/products.php; entitled "ColorView United Kingdom"; Aug. 30, 2007 10:40 AM; pp. 1-5.

* cited by examiner

*Primary Examiner* — Joseph Martinez
*Assistant Examiner* — James R Greece
(74) *Attorney, Agent, or Firm* — Valauskas Corder LLC

(57) ABSTRACT

A lens and a method of making lenses suitable for color blindness correction are disclosed. The corrective lens may be formed of an optically transparent base material, which is tinted to the desired color for correction by immersion in a colorant dye. The color tinted lens is then tinted by a neutral tint dye to render the lens observable as a regular corrective lens. If desired, the dyes may be heated during immersion.

5 Claims, 2 Drawing Sheets

TINTED LENS AND METHOD OF MAKING SAME

BACKGROUND

The present disclosure relates to the lens fabrication arts. It finds particular application in connection with a lens for correcting discrimination of color by a patient (or color blindness as it is commonly known) and for alleviating symptoms of dyslexia through a colored lens prescription. However, it is to be appreciated that the exemplary lens and fabrication method are not limited to such applications and may find application in the selective adjustment of light transmission through a lens for other purposes.

In the field of opthalmology, it has been found that by providing lenses which selectively filter the incident light in the visible region of the spectrum, e.g., from about 650 nm (red region) to 475 nm (blue region), particularly in the shorter (blue) wavelengths, the light received through the lens is thereby modified so as to affect the manner in which it is handled neurologically, by the viewer. Lenses have been produced for patients suffering from color blindness which are individually color tinted for the characteristics of a patient's vision. Such corrective lenses enable the patient to train their optical discernment to perceive colors correctly and also to address many of the symptoms of dyslexia. The technique of providing individually tinted lenses for a patient's eye for correcting color discrimination thus results in the patient having corrective lenses of different color tint indicating the purpose of the correction to observers and results in a cosmetically unacceptable appearance. To render the appearance more acceptable, U.S. Pat. No. 6,089,712 discloses a lens of this type, where a central portion of the lens is tinted with the desired color correction for the individual eye and the outer surface of the lens is coated with a mirrored reflective material to make the color tinting invisible to an outside observer. The technique described in the '712 patent provides the desired color correction. However, the presence of the mirror reflective surface on the lens has been found to be cosmetically unacceptable to some. Additionally, the mirrored surface may reflect such a high percentage of light that the spectacles may produce an image that is too dark for the wearer.

Thus, it is desired to provide color corrective lenses for patients with color blindness or dyslexia to treat the disability but in which the color tints are not discernible to an outward observer and which are not prohibitively costly.

BRIEF DESCRIPTION

In accordance with one aspect of the exemplary embodiment, a method of making an opthalmic lens which may be used for correction of color discrimination of a patient, includes forming a lens of relatively open molecular structure material, tinting the lens to a desired corrective color with ophthalmic dye capable of penetrating the lens molecular structure and dyeing the lens with a dye having a neutral appearing tint capable of penetrating the lens molecular structure.

In another aspect, an opthalmic lens, which may be used for correcting color blindness/dyslexia in a wearer, includes an opthalmic base formed of material of relatively wide molecular spacing, a color tint dye forming a color tinted base, and a neutral tint dye in the color tinted base and operative to render the color tinted base to the appearance of a neutral tint to an outward observer.

In another aspect, an opthalmic lens includes a front exterior surface configured to be located furthest from the wearer's eye and a rear exterior surface is configured to be positioned closest to the wearer's eye. A body intermediate the first and second includes first and second regions, the second region being spaced from the front surface by the first region. A light filtering material and a mask material are dispersed in the body. A ratio of a concentration of the mask material to a concentration of the light filtering material is higher in the first region than in the second region whereby the mask material masks a tint imparted to the body by the filtering material.

In another aspect, a method of forming an opthalmic lens includes infiltrating a light filtering material into a body in the shape of the lens, thereafter, infiltrating a mask material into the body, to provide a ratio of a concentration of the mask material to a concentration of the light filtering material which is higher in a first region of the body than in a second region of the body further from a front surface of the body than the first region, whereby the mask material masks a tint imparted to the body by the light filtering material.

DETAILED DESCRIPTION

Figure 1:
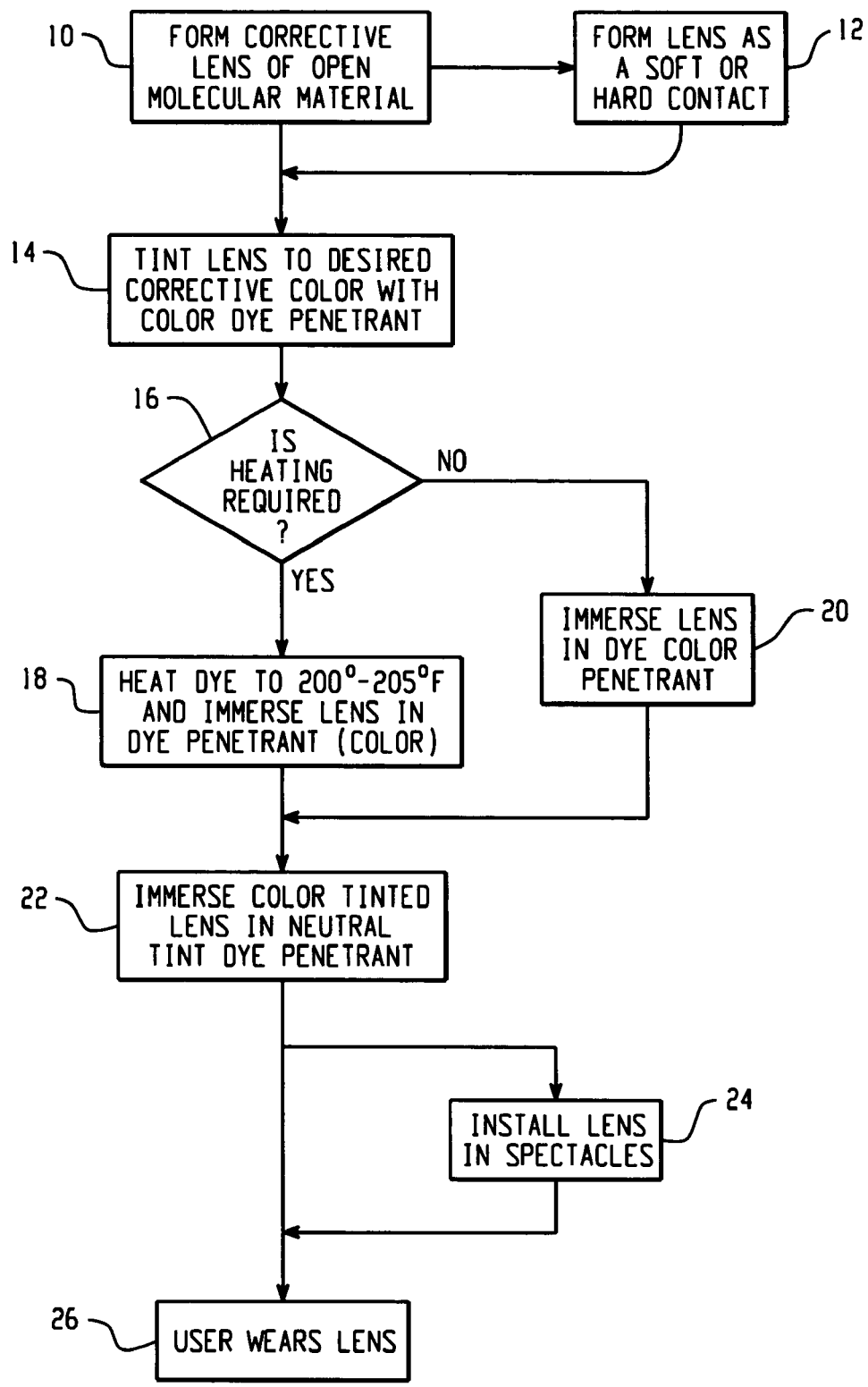
FIG. 1 is a flow diagram of the method of the present disclosure.

The present disclosure relates to a lens and to a method of making such lenses. The lenses may be used for correcting the inability of a person to perceive colors properly or color blindness or to alleviate many of the symptoms of dyslexia in a patient. The exemplary lens selectively filters light transmitted through the lens to provide filtered light which is tailored to the patient's vision. The lens may include an optically transparent base material in which a light filtering material is dispersed. The light filtering material may be a color tint dye or combination of color tint dyes. The appearance of the light filtering material is masked, to the view of an outward observer, by a masking material. The masking material may comprise a neutral tint dye, e.g., one with a slight blue, brown, or gray tint. The masking material may be dispersed in the base material and may be concentrated more highly toward the surface of the lens. As a result, the neutral tint predominates, as viewed by the outward observer.

In one aspect of the exemplary embodiment, lenses of different color tint are provided individually for the patient's eyes and in a manner which renders the color corrective lenses substantially indistinguishable from ordinary corrective lenses to the outward observer.

One exemplary method of the present disclosure provides for tinting a corrective lens of sufficiently open or spaced molecular structure to permit absorbance of a color tint dye, to provide the desired color correction. The color tinted lens is then dyed with a neutral tint dye to give the outward appearance of an ordinary corrective (or non-corrective) lens, or of a lens which is lightly tinted as in a pair of sunglasses. The method of the present disclosure may be applied to a variety of opthalmic lenses (lenses though which light is transmitted into a person's eye), including spectacle lenses, soft or rigid contact lenses, clip-on lenses, and binoculars. The ophthalmic lens may have a prescriptive correction or be uncorrected.

In an exemplary embodiment, the filtering material, e.g., color tint dye, and/or lens is heated to a suitable temperature for penetration of the color correcting dye, such as at least about 800 and up to about 120° C., e.g., about 93° C. to 96° C. (200° F. to 205° F.), and the lens is contacted with the heated dye, e.g., immersed in the dye. The procedure is then repeated for the neutral tint dye.

Other methods of infiltrating the filtering material and mask material are contemplated. In another aspect, the filtering material and mask material are sequentially infiltrated into the lens base material under vacuum.

The method of the present disclosure thus gives a unique way of correcting color blindness in a patient in a manner which provides lenses which may be worn and which give an appearance which disguises the color correction and provides the appearance of regular lenses.

The filtering material (color tint dye) may be any suitable material for modifying the transmittance spectrum of visible light transmitted through the lens. In general the visible spectrum ranges from about 400 to 700 nm. The filtering material may be one which modifies the transmission of light in at least a region of the spectrum between 400 nm and 700 nm, e.g., by selectively absorbing a predominant portion of the light within a selected wavelength range of the visible spectrum (e.g., the filtering material prevents transmission of at least 50% of the light in the selected wavelength range). A lens comprising the filtering material may transmit substantially all light in wavelengths that are outside the selected range (e.g., at least 80% of the light outside the selected range is transmitted). The filtering material may comprise a color tint dye with a peak light absorption within the 650-475 nm range, such that light transmitted by the lens has a red, blue, or green cast when viewed by a normal person. However, for a person with color blindness, the modified light allows the patient to view certain colors more easily. For example, in the case of a lens which incorporates a red-transmitting filtering material, the light transmitted may have a transmittance cut off at about 600 nm, with wavelengths from about 600-650 nm being predominantly transmitted and wavelengths from about 450-600 nm being predominantly filtered out. The filtering material may be one which gives the lens a colored tint that would be clearly apparent to an outside observer (in the absence of the mask material). In the exemplary embodiment, the filtering material is formulated as a penetrant, i.e., is one which is able to penetrate the molecular structure of the lens body during fabrication. To act as a penetrant the molecules of the dye selected as the filter material may be finely dispersed in a liquid carrier material, such as a solvent, and be of sufficiently small size to penetrate the molecular structure of the lens body.

The mask material may be a neutral tint dye which is substantially transmissive to light throughout the visible range of the spectrum. In particular, the neutral tint material is one which absorbs light generally evenly over the entire visible range (e.g., transmits at least about 80% of the light at wavelengths between 450 and 650 nm). In the exemplary embodiment, the mask material is formulated as a penetrant, i.e., is one which is able to penetrate the molecular structure of the lens body during fabrication. By concentrating the mask material near the outside of the lens, the tint effect of the filtering material is masked to an outside observer. The lens may have a slight blue, grey, or brown cast when viewed by an outside observer with normal sight, depending on the particular neutral tint selected as the mask material. The mask material is present in the lens at a sufficient concentration to mask any colored tint introduced by the filter material. In this way, a pair of lenses worn by a patient, one of which incorporates a filtering material which transmits light predominantly in a first, e.g., the red region, and the other which transmits in predominantly a second, e.g., the green region of the visible spectrum may have substantially the same neutral tint appearance to an outside observer.

Exemplary color tint dyes for correcting color blindness are well known, and disclosed, for example, in U.S. Pat. Nos. 3,586,423; 3,701,590; 4,998,817; 6,089,712; and 7059719. Exemplary color tint dyes include azo dyes, catalytic (reactive) dyes and sulfur dyes and those which are permitted for use in contact lenses by the FDA.

Exemplary neutral tint dyes include those used in the formation of sunglasses and those which are permitted for use in contact lenses by the FDA.

In the case of water-based dyes, the dyes selected for the mask material and filtering material may be hydrophobic to enable the dye molecules to preferentially enter the lens base material, as opposed to remaining in the water in which the dye is mixed.

Suitable catalytic dyes for use as the filtering material and mask material may be obtained from Brain Power International, Worcestershire, England.

Exemplary base materials which may be used for the lens include optically transparent polymeric materials, such as, for example diethylene glycol bis(allyl carbonate), widely known as CR39® composition, polycarbonate, Perspex, combinations thereof, or other lens forming materials. In some embodiments, the base material is one which allows penetration of the filtering material and/or mask material by diffusion and retains the infiltrated materials within the base material. The base material may form a chemical bond with the filter and/or mask material or otherwise hold the molecules of the dye within its three dimensional structure. In general, glass does not permit penetration of filtering materials and mask materials from liquid dye solutions.

In the case of contact lenses, the polymeric material may comprise any suitable lens forming polymer. Such as hydrogel copolymers, which are cross linked polymeric systems that can absorb and retain water in an equilibrium state. Hydrogel copolymers are generally formed by polymerizing at least one hydrophilic monomer and a crosslinking agent. Representative, hydrophilic monomers include: unsaturated carboxylic acids, such as methacrylic acid and acrylic acid; (meth)acrylic substituted alcohols, such as 2-hydroxyethylmethacrylate and 2-hydroxyethylacrylate; vinyl lactams, such as N-vinyl pyrrolidone; and (meth)acrylamides, such as methacrylamide and N,N-dimethylacrylamide. Typical crosslinking agents include polyvinyl, typically di- or tri-vinyl monomers, such as di- or tri(meth)acrylates of diethyleneglycol, triethyleneglycol, butyleneglycol and hexane-1,6-diol; and divinylbenzene. A specific example of a hydrogel-forming monomer mixture is polymacon, composed primarily of 2-hydroxyethylmethacrylate with a small amount of diethyleneglycol dimethacrylate as a crosslinking monomer. Optionally, the monomer mixture may include a silicone-containing monomer in order to form a silicone hydrogel copolymer. Examples of silicone-containing monomers include: monomers including a single activated unsaturated radical, such as methacryloxypropyl tris(trimethylsiloxy)silane, pentamethyldisiloxanyl methylmethacrylate, tris (trimethylsiloxy)methacryloxy propylsilane, methyidi (trimethylsiloxy)methacryloxymethyl silane, 3-[tris (trimethylsiloxy)silyl]propyl vinyl carbamate, and 3-[tris (trimethylsiloxy)silyl]propyl vinyl carbonate; and multifunctional ethylenically "end-capped" siloxane-containing monomers, especially difunctional monomers having two activated unsaturated radicals. See, for example, U.S. Pat.

No. 7,147,326. Many other lens-forming monomers and specific copolymers thereof are well known in the art.

The dye to be used as the filtering material and/or mask material may be infiltrated into the base material of the lens from a solution of the dye in a suitable solvent, such as water or an organic solvent. In other embodiments, the filtering material may be incorporated into the lens material during polymerization of the lens material.

Referring to FIG. 1, one method of forming the corrective lens is shown by way of example. A corrective lens body for the particular patient's eye is formed at step 10 of an ophthalmic quality transparent base material by any of the techniques known in the art of lens making. The lens may be formed as a spectacle lens or, alternatively, may be formed as a soft or hard contact lens as indicated at step 12. In some embodiments, the lens may be machined or otherwise shaped to provide a refractive correction, such as a prescriptive correction for short or long sight. In some embodiments, the lens may be formed without any prescriptive correction.

The method then proceeds to step 14 and the lens base is tinted to the desired corrective color with the color tint dye. Proceeding to step 16, the query is made as to whether heating is required; and, if affirmative, the dye or solution thereof is heated to a suitable temperature for infiltration of the color tint dye, e.g., a temperature of about 95° C. (205° F.)-118° C. (295° F.). The rate of penetration of the dye and/or the amount of the dye which the base material is able to take up may be increase with increasing temperature. In general, the temperature is selected to be below a temperature at which the lens may be damaged through warping, melting or other deformation and below the boiling point of any solvent in which the dye is incorporated.

The lens is immersed in the heated color tint dye or otherwise contacted therewith for a sufficient period of time for the dye to infiltrate the base material, such as about 15-30 minutes. Alternatively or additionally, the lens may be heated. If the determination at step 16 is not in the affirmative, the method proceeds to step 20 and the lens is immersed in color tint dye with little or no heating.

After the infiltration of the color tint dye into the lens body, the color tinted body is removed from the color tint dye and may be allowed to cool for a period of time sufficient for the lens to cure or otherwise fix the color tint dye within the lens body.

Subsequent to steps 18 or 20, the method proceeds to step 22 where the color tinted lens is tinted with a neutral tint dye. If desired, the procedure may be analogous to that of step 18, i.e., heating the dye or lens prior to immersing or otherwise contacting the lens with the dye or solution thereof.

In one embodiment, the infiltration of the filtering material and/or mask material may be conducted at ambient pressure. In other embodiments, the infiltration process may be conducted under a vacuum.

Subsequent to the neutral tint dyeing of step 22, the lens is installed in spectacles at step 24 if a spectacle lens has been made. If, however, the lens is formed as a soft or rigid contact lens in step 12, the lens may be then worn by the user as indicated in step 26.

In the case of two lenses to be worn as spectacles or contact lenses, a different filtering material for providing a different corrective color may be used in each lens. In other embodiments, both lenses may incorporate the same filtering material. The same mask material may be used in both lenses.

It is believed that when the filtering material is infiltrated into the base material of the lens, it penetrates into the base material from the surface of the lens to at least a first depth (or entirely through the lens body). Thereafter, when the mask material is infiltrated into the already infiltrated base material, it remains predominantly near the surface of the lens. The concentration gradients of the mask and filtering materials in the resulting infiltrated base material are thus different. For example, a ratio of the concentration of the mask material to the concentration of the filtering material may be higher nearer the surface of the lens than in a region further from the surface of the lens. The concentration of the mask material may be expressed as total moles of color tint dye per cc of base material. The concentration of the filtering material may be expressed as total moles of the neutral tint dye per cc of base material.

Figure 2:
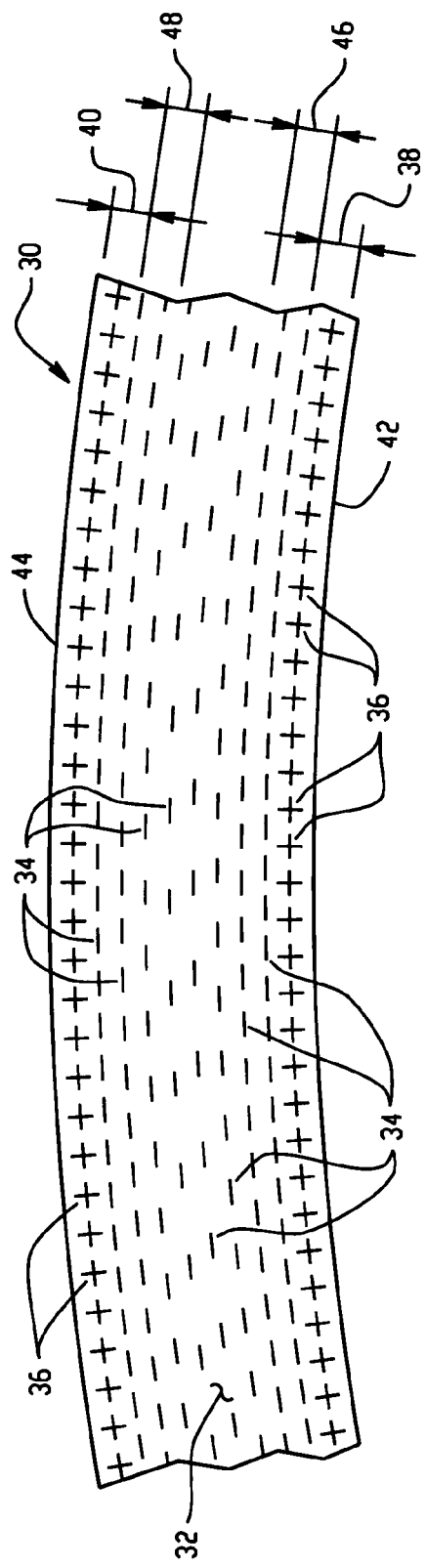
FIG. 2 is a cross-section of a portion of a lens of the present disclosure.

Referring to FIG. 2, a portion of a lens, such as a spectacle lens or contact lens, indicated generally at 30, includes an ophthalmic base 32 formed of a base material with color tint dye molecules 34 dispersed therein (indicated by a "−" sign). Neutral tint dye molecules 36 (indicated by a "+" sign) are dispersed in the base material. The neutral tint dye molecules are concentrated predominantly in one or both of surface regions 38, 40 located adjacent opposed exterior surfaces 42, 44 of the lens. Surface 42 is the rear surface of the lens 30 which is to be positioned closest to the patient's eye, while surface 44 is the front surface of the lens to be positioned furthest from the patient's eye, and thus closest to an outside observer. As noted above, the color tint dye may be an ophthalmic dye with transmissibility of only a desired portion of the visible spectrum or desired chromaticity band while the neutral tint dye may be an ophthalmic dye of even transmissibility across the visible spectrum. The base 32 into which the mask and filter materials are incorporated is integrally formed, as a single piece, without lamination or coating, e.g., by molding, optionally followed by lathing or other shaping.

The color tint dye molecules 34 may be dispersed throughout the lens base material 32 or may be predominantly in regions 46, 48, which are spaced from the lens surfaces by the surface regions 38, 40, respectively. The regions 38 and 40 are thus closer to the respective front and rear surfaces than the respective adjacent regions 46, 48. Regions 38 and 40 extend generally parallel with the respective surfaces 42, 44. Although FIG. 2 illustrates these regions 38, 40 as containing only the mask molecules 36, it is to be appreciated that this region may also contain some of the filter molecules 34, but generally too few, at least near the surface, to impact the neutral tint appearance of the lens.

In the embodiment shown, a ratio of the concentration of the mask material 34 to the concentration of the filtering material 36 is higher in region 40, nearer the surface 44 of the lens, than in adjacent region 48, further from the surface 44 of the lens. Similarly, a ratio of the concentration of the mask material 34 to the concentration of the filtering material 36 may higher in region 38, nearer the surface 42 of the lens, than in region 46, further from the surface of the lens, although this is not required. In one embodiment, the concentration of the colorant dye 34 is higher in the second region 48 than in the first region 40 (and may also be higher in the region 46 than in region 38). The concentration of the neutral tint dye 36 is higher in the first region 40 than in the respective second region 48 (and optionally also higher in region 38 than in region 46).

Figure 3:
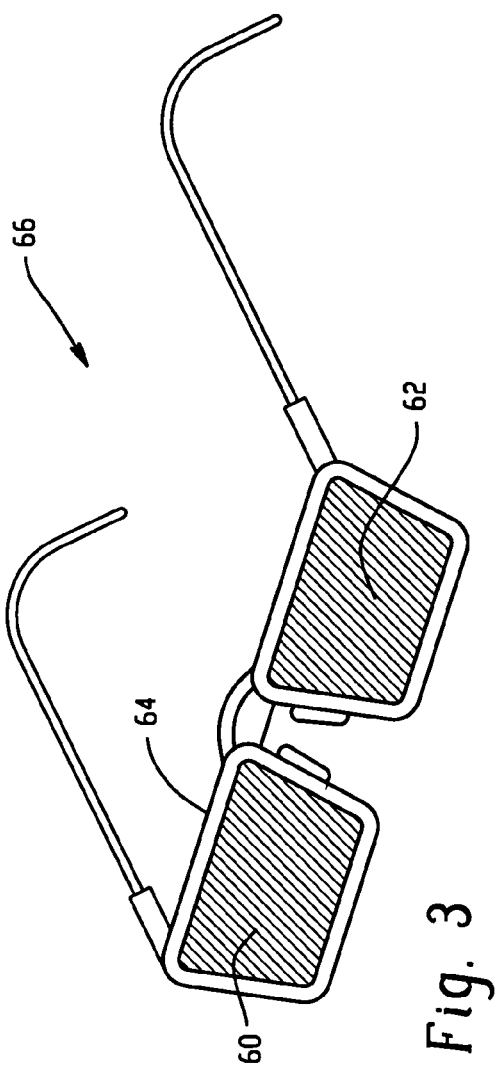
FIG. 3 is an exemplary embodiment configured with spectacles.

Referring to FIG. 3, a pair of lens 60, 62 of different color tint according to the present disclosure are shown, in an exemplary embodiment as mounted in a frame 64 forming spectacles indicated generally at 66.

In another embodiment, the lens base 32 may be formed by lamination of layers rather than as a single integral layer as shown in FIG. 2. For example, the lens may comprise a first base layer which incorporates the neutral tint dye and a second base layer, to be positioned closer to the wearer than the first base layer. The first base layer may be formed in a separate step from the second base layer, e.g., by forming the first base layer and laminating or coating the second base layer thereto, or vice versa. For example, a separate coating or lamination is applied to a lens for correcting color discrimination, such as a coating with a neutral color appearance, to disguise the underlying color tint of the corrective lenses.

Figure 4:
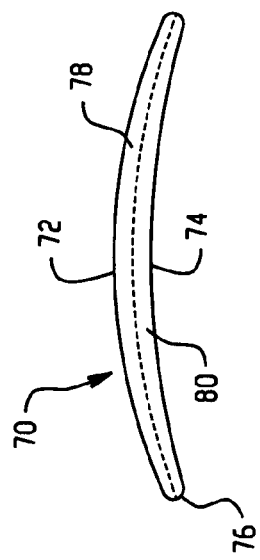
FIG. 4 is an exemplary embodiment configured as a contact lens.

Referring to FIG. 4, an exemplary lens, such as a contact lens is indicated generally at 70 and comprises a front exterior surface 72, curved to be located furthest from the wearer's eye, a rear exterior surface 74, curved to be positioned closest to the wearer's eye and a body 76 intermediate the first and second surfaces. The lens body includes a first region or layer 78, closest to the front surface and a second region or layer 80, spaced from the front surface by the first region. A ratio of the concentration of the mask material 34 to the concentration of the filtering material 36 is higher, on average, in region 78, nearer the front surface 72 of the lens than in region 80, further from the front surface of the lens. Also, a concentration of the colorant dye may be higher in the second region 80 than in the first region 78. A concentration of the neutral tint dye may be higher in the first region 80 than in the second region 78.

The present disclosure thus describes a unique low cost technique for making lenses that may be used for correcting color blindness or alleviating symptoms of dyslexia in a patient, which lenses, when worn either as contacts or in spectacles, give the outward appearance of neutral tinted lenses and the color correction is otherwise indistinguishable from regular corrective lenses.

The exemplary embodiment has been described with reference to the drawing. Obviously, modifications and alterations will occur to others upon reading and understanding the preceding detailed description. It is intended that the exemplary embodiment be construed as including all such modifications and alterations and equivalents thereof insofar as they come within the scope of the appended claims.

The invention claimed is:

1. An ophthalmic lens used to correct color blindness or dyslexia in a wearer, comprising:
    (a) an opthalmic base formed of material of wide molecular spacing, wherein said ophthalmic base includes a front surface and a rear surface each located adjacent to first regions, said first regions are spaced between second regions and said front surface and said rear surface;
    (b) a color tint dye dispersed within said ophthalmic base, wherein said color tint dye is concentrated predominantly in at least one of said second regions forming a color tinted base; and
    (c) a penetrable neutral tint dye dispersed within said color tinted base, wherein said neutral tint dye is concentrated predominantly in at least one of said first regions such that a ratio of a concentration of said neutral tint dye to a concentration of said color tint dye is higher in said first regions than in said second regions and a ratio of a concentration of said color tint dye to a concentration of said neutral tint dye is higher in said second regions than in said first regions, said neutral tint dye operative to cause said color tinted base to appear to be a neutral tint to an outward observer, wherein said ophthalmic base, said color tint dye, and said neutral tint dye are integrally formed.

2. The ophthalmic lens according to claim 1, positioned in each of two lens openings of a frame to form spectacles, each of said lens comprising different said color tint dye.

3. The ophthalmic lens according to claim 1, wherein said ophthalmic base comprises diethylene glycol bis (allyl carbonate).

4. The ophthalmic lens according to claim 1, wherein said ophthalmic base is a prescriptive lens.

5. The ophthalmic lens according to claim 1, wherein a concentration gradient of said neutral tint dye between said front surface and said rear surface is different from a concentration gradient of said color tint dye between said front surface and said rear surface.

* * * * *